US009118893B2

(12) United States Patent
Aizawa

(10) Patent No.: US 9,118,893 B2
(45) Date of Patent: Aug. 25, 2015

(54) DISPLAY CONTROL APPARATUS, DISPLAY CONTROL METHOD, AND PROGRAM

(75) Inventor: Eiji Aizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 404 days.

(21) Appl. No.: 13/323,623

(22) Filed: Dec. 12, 2011

(65) Prior Publication Data

US 2012/0147156 A1 Jun. 14, 2012

(30) Foreign Application Priority Data

Dec. 14, 2010 (JP) ................................ 2010-278091

(51) Int. Cl.
*H04N 13/04* (2006.01)
*H04N 13/00* (2006.01)

(52) U.S. Cl.
CPC ....... *H04N 13/0018* (2013.01); *H04N 13/0033* (2013.01); *H04N 2013/0081* (2013.01)

(58) Field of Classification Search
CPC .................. H04N 13/0033; H04N 2013/0081; H04N 2013/0088; H04N 13/0022; H04N 13/0018; G09G 3/003
See application file for complete search history.

(56) References Cited

U.S. PATENT DOCUMENTS

| 8,044,997 | B2 * | 10/2011 | Masuda et al. ................... 348/51 |
| 2003/0090485 | A1 * | 5/2003 | Snuffer ........................ 345/422 |
| 2010/0053308 | A1 * | 3/2010 | Namii et al. .................... 348/47 |
| 2010/0220178 | A1 * | 9/2010 | Takahashi et al. .............. 348/54 |
| 2011/0032341 | A1 * | 2/2011 | Ignatov et al. .................. 348/51 |
| 2011/0109720 | A1 * | 5/2011 | Smolic et al. ................... 348/43 |
| 2012/0084652 | A1 * | 4/2012 | Martinez Bauza et al. ... 715/719 |
| 2012/0127062 | A1 * | 5/2012 | Bar-Zeev et al. ................ 345/6 |
| 2012/0249750 | A1 * | 10/2012 | Izzat et al. ...................... 348/47 |
| 2013/0162641 | A1 * | 6/2013 | Zhang et al. ................... 345/419 |

FOREIGN PATENT DOCUMENTS

| JP | 8-191460 A | 7/1996 |
| JP | 2009-239389 A | 10/2009 |

* cited by examiner

*Primary Examiner* — Thai Tran
*Assistant Examiner* — Stephen Smith
(74) *Attorney, Agent, or Firm* — Canon USA Inc IP Division

(57) ABSTRACT

An image processing apparatus according to the present invention that displays a stereoscopic image to a viewer, includes an input unit that inputs image data related to the stereoscopic image, a detection unit that detects a change of a projection amount of the stereoscopic image from the image data input by the input unit, a generation unit that generates the image obtained by suppressing high-frequency components from the stereoscopic image when the change of the projection amount is detected by the detection unit, and a display control unit that displays a video image generated by the generation unit in a display apparatus.

7 Claims, 11 Drawing Sheets

FIG.8

| OBJECT ID | X COORDINATE | Y COORDINATE | AMOUNT OF PARALLAX | AMOUNT OF PROJECTION |
|---|---|---|---|---|
| @1(41) | 260 | 410 | 50 | 2 |
| @2(42) | 650 | 400 | 70 | 3 |
| @3(43) | 1500 | 700 | 10 | 1 |
| | | | | |
| | | | | |
| | | | | |

DISPLAY CONTROL APPARATUS, DISPLAY CONTROL METHOD, AND PROGRAM

BACKGROUND OF THE INVENTION

1. Field of the Invention

The present invention relates to a display control apparatus suitably used for, for example, stereoscopic training a display control method, and a program.

2. Description of the Related Art

A display which enables viewing of stereoscopic video by showing different images to both eyes of a viewer is known. On such a display, a video subject for the left eye and the video subject for the right eye are arranged in shifted positions according to the distance and stereoscopic training can be provided by using the parallax. A parallax barrier, polarizing filter, and time division have been realized as methods of displaying right and left images on the same display surface.

However, when stereoscopic video being viewed is switched, the sense of depth changes rapidly, which often makes fatigue caused by the viewing accumulate. Thus, as a method of preventing viewing fatigue, Japanese Patent Application Laid-Open No. 2009-239389 discusses a method of displaying interpolating stereoscopic video in which parallax is gradually changed before video is displayed by generating interpolating video with less parallax than the video original. Accordingly, a rapid parallax change is mitigated by viewing the interpolating video so that fatigue can be reduced. Moreover, Japanese Patent Application Laid-Open No. 8-191460 discusses a method of reducing fatigue of an operator by delaying switching timing of reproduced images to artificially prolong the period of a repeated operation after a detection switch is pressed when the operator feels fatigue due to the repeated operation.

However, according to the method discussed in Japanese Patent Application Laid-Open No. 2009-239389, a beginning portion is replaced by interpolating images and thus, the scene at the beginning lacks stereoscopic vision depending on video content when stereoscopic video is switched. Also according to the method discussed in Japanese Patent Application Laid-Open No. 8-191460, if video content when switched contains a moving subject, the speed of the moving subject in the video is also slowed down by delaying the switching timing of reproduced images, leading to video which caused an uncomfortable feeling.

SUMMARY OF THE INVENTION

According to an aspect of the present invention, a display control apparatus that displays a stereoscopic image to a viewer, includes an input unit that inputs image data related to the stereoscopic image, a detection unit that detects a change of an projection amount of the stereoscopic image from the image data input by the input unit, a generation unit that generates the image obtained by suppressing high-frequency components from the stereoscopic image when the change of the projection amount is detected by the detection unit, and a display control unit that displays a video image generated by the generation unit in a display apparatus.

According to an exemplary embodiment of the present invention, a parallax change can be mitigated without degrading video quality so that fatigue due to viewing of switched video can be reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a diagram illustrating a configuration example of an object list.

DESCRIPTION OF THE EMBODIMENTS

Various exemplary embodiments, features, and aspects of the invention will be described in detail below with reference to the drawings.

In a present exemplary embodiment, as a method of video display, the projection amount from a display screen is detected in stereoscopic training and when the display is switched, a video image of a region where the change amount of projection of video is large, is blurred and then gradually deblurred. The projection amount refers to an amount by which a subject looks projected forward when a viewer views stereoscopic video based on a parallax generated by arranging the subject in shifted positions on a video image for the right eye and a video image for the left eye according to the distance. The configuration shown in the embodiment below is only an example and the present invention is not limited to the illustrated configuration.

Figure 1:
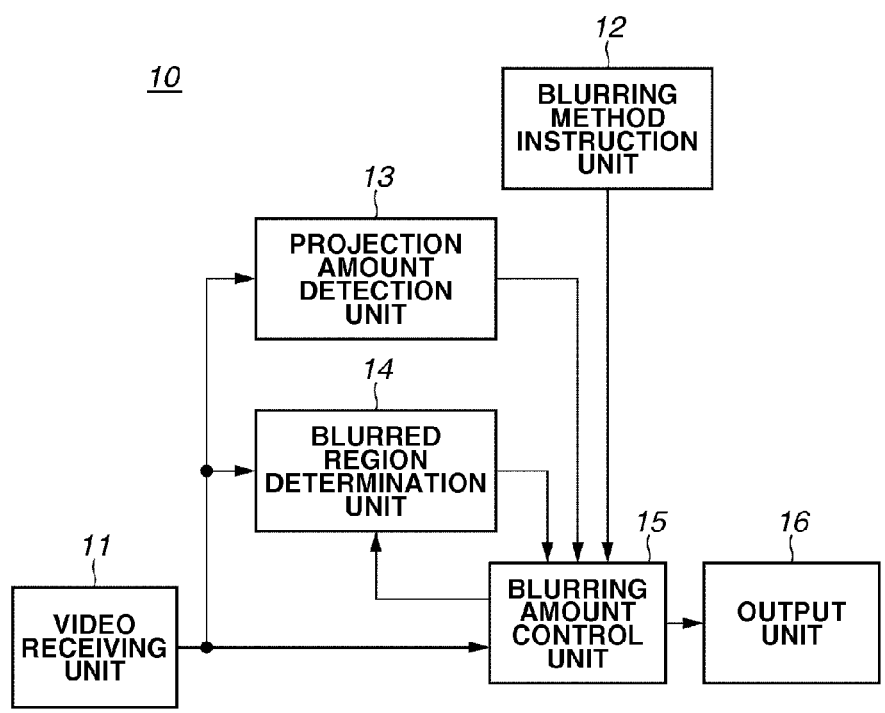
FIG. 1 is a block diagram illustrating a function configuration example of a display control apparatus according to an exemplary embodiment.

FIG. 1 is a block diagram illustrating a function configuration example of a display control apparatus 10 according to the present exemplary embodiment.

In FIG. 1, a video receiving unit 11 receives data of video content (video data) such as a broadcast wave and a video signal input from outside. When an operation instruction is input from a user to generate a blurred image, a blurring method instruction unit 12 notifies a blurring amount control unit 15 described below of activation conditions for generating a blurred image.

The blurring method instruction unit 12 notifies the blurring amount control unit 15 of the activation conditions for generating a blurred image, for example, when a channel of a terrestrial broadcast wave is switched or a terrestrial broadcast wave is switched to a video signal. Also, activation conditions for generating a blurred image are met when the scene of a terrestrial broadcast wave of video content received by the video receiving unit 11 is switched or the time of specified content arrives. Further, settings to activate generation of a blurred image in a region of a specified screen can be made. In video editing, it is possible to specify the time when blurring is generated or allow a selection of connection positions of video content.

A projection amount detection unit 13 detects a change of the projection amount of video content. A blurred region determination unit 14 extracts a region where a change of the projection amount equal to or more than the threshold specified by the blurring amount control unit 15 occurs and determines the region as a region to generate a blurred image. The blurring amount control unit 15 performs control of the overall function of generation of a blurred image and stereoscopic training. Also, the blurring amount control unit 15 notifies the blurred region determination unit 14 of the threshold if activation conditions for generating a blurred image notified from the blurring method instruction unit 12 are matched and the change of the projection amount detected by the projection amount detection unit 13 is equal to or more than a fixed value.

The threshold instructed from the blurring amount control unit 15 to the blurred region determination unit 14 is changed as frequently as needed and based on the duration of stereoscopic training or the degree of change of the projection amount for each video frame according to a difference of projection amounts. For example, the threshold is changed in such a way that the degree of blurring is attenuated over time. Thus, the blurred region determination unit 14 extracts regions where a change of the projection amount equal to or more than the threshold instructed from the blurring amount control unit 15 occurs and notifies the blurring amount control unit 15 of regions for each difference of projection amounts.

The blurring amount control unit 15 generates blurring of video in regions notified from the blurred region determination unit 14. More blurred video is generated in regions where the difference of projection amounts notified from the blurred region determination unit 14 is larger. The blurring amount control unit 15 changes the threshold instructed to the blurred region determination unit 14 as required and performs control so that video is generated by gradually deblurring blurred video or gradually reducing blurred video with the passage of time by repeating the above processing. An output unit 16 is a unit that outputs video received by the video receiving unit 11 or video in which blurring is generated by the blurring amount control unit 15, to a display unit.

Figure 9:
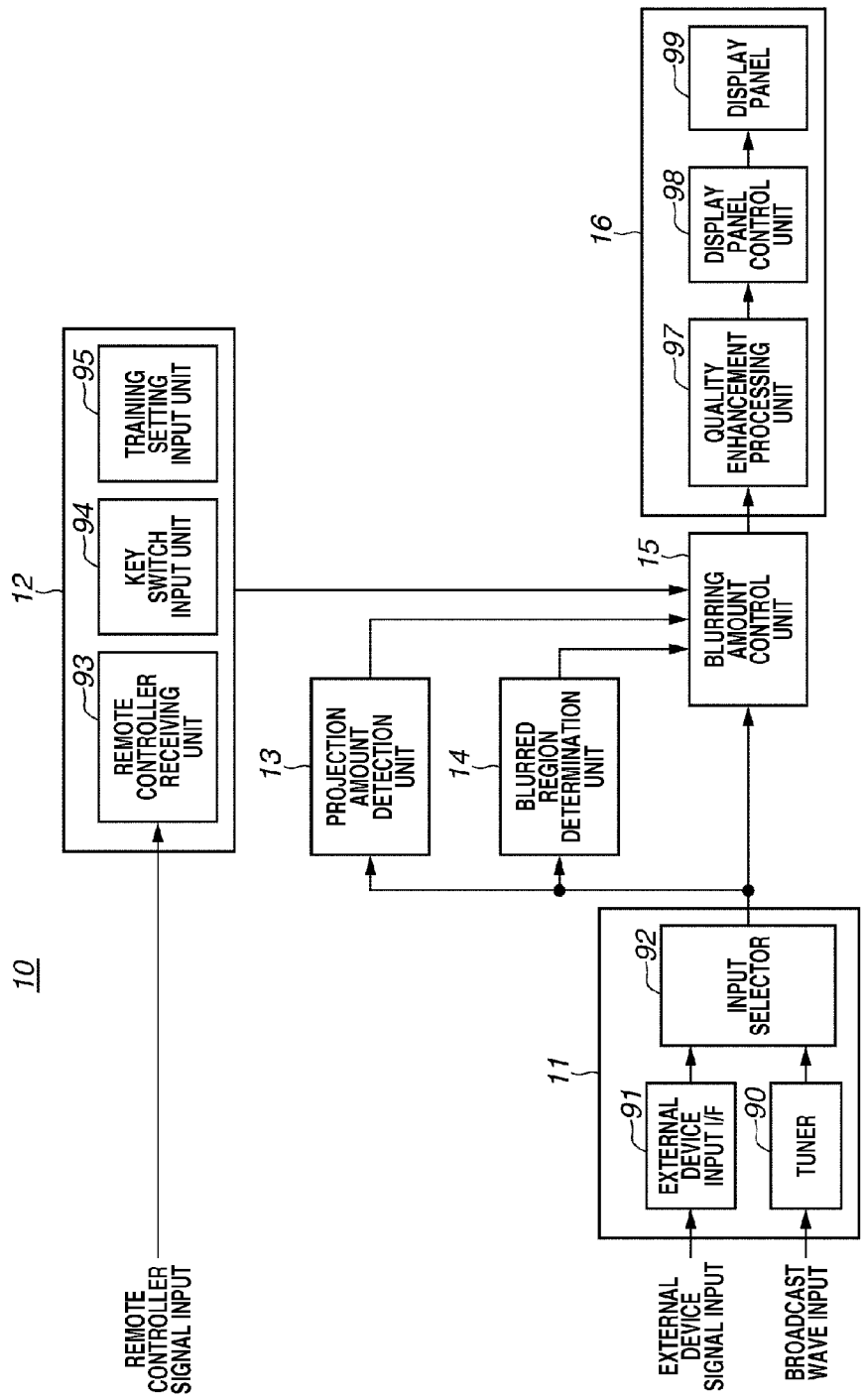
FIG. 9 is a block diagram illustrating a detailed configuration example of the display control apparatus according to the exemplary embodiment.

FIG. 9 is a block diagram illustrating a detailed configuration example of the display control apparatus 10 according to the present exemplary embodiment.

In FIG. 9, the blurring method instruction unit 12 includes a remote controller receiving unit 93, a key switch input unit 94, and a training setting input unit 95.

The remote controller receiving unit 93 extracts an operation command by receiving and decoding an infrared light. The key switch input unit 94 is a switch to perform various operations such as switching of the broadcast channel or video port and volume control. The training setting input unit 95 receives activation conditions for generating a blurred image as described above. The blurring method instruction unit 12 may be configured by using a touch panel and a pointing device such as a touch panel and a mouse may be used to input information.

The video receiving unit 11 includes a tuner 90, an external device input interface 91, and an input selector 92. The tuner 90 extracts and demodulates a signal of a desired broadcast channel from a broadcast wave input from an antenna or cable. The tuner 90 also decodes demodulated stream data to output baseband video data.

The external device input interface 91 is used to input video data from outside. More specifically, the external device input interface 91 is configured by an interface based on the digital video signal standard such as an analog composite signal, analog component signal, High-Definition Multimedia Interface (HDMI) and Digital Visual Interface (DVI) and inputs various kinds of video data. The input selector 92 receives video data input from the tuner 90 or the external device input interface 91 to output specified video data only.

The output unit 16 includes a quality enhancement processing unit 97, a display panel control unit 98, and a display panel 99. The quality enhancement processing unit 97 receives video data input from the blurring amount control unit 15 to perform image processing such as scaling, edge corrections, and color corrections on the input video data. The display panel control unit 98 performs control to input video data on which image processing has been performed and to display the input video on the display panel 99. At this point, the display panel control unit 98 generates a synchronization signal of timing fitted to characteristics of the display panel 99 and outputs display screen data in accordance with the synchronization signal. The display panel control unit 98 also converts a signal voltage level and generates an auxiliary signal. The display panel 99 includes any display method such as the liquid crystal, plasma display, projection, cathode ray tube (CRT), and organic electroluminescence (EL).

Though not illustrated, the display control apparatus 10 according to the present exemplary embodiment contains a sound processing unit to reproduce audio data contained in content, amplifier, and speaker.

An operation example of the display control in the present exemplary embodiment will be described below. In the present exemplary embodiment, graphics that gradually move to the deepest/shallowest depth are displayed when the display is switched.

Figure 2:
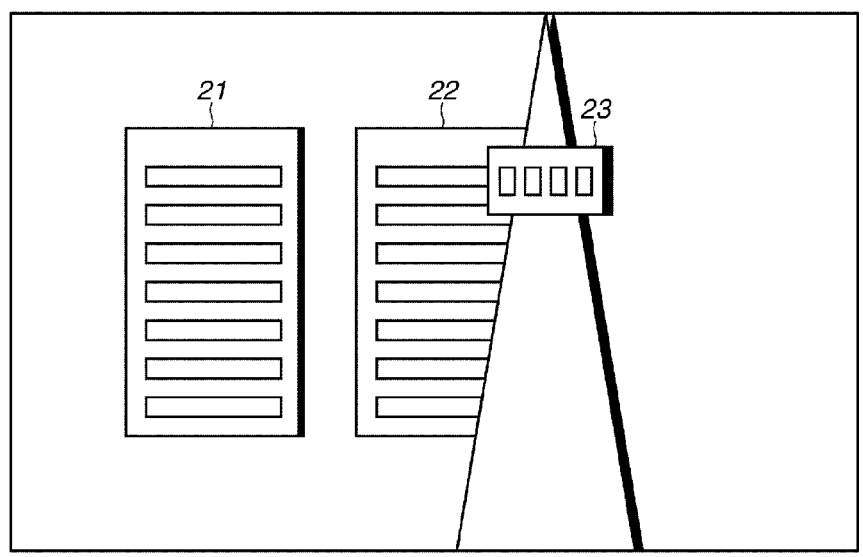
FIG. 2 is a diagram exemplifying video content displayed before being switched.

FIG. 2 is a diagram exemplifying video content displayed before display content is switched. In FIG. 2, building objects 21, 22 are arranged side by side on the screen and a building object 23 is displayed on the forefront in the video content. These objects are displayed in such a way that images for the right eye and images for the left eye are overlapped.

Figure 3:
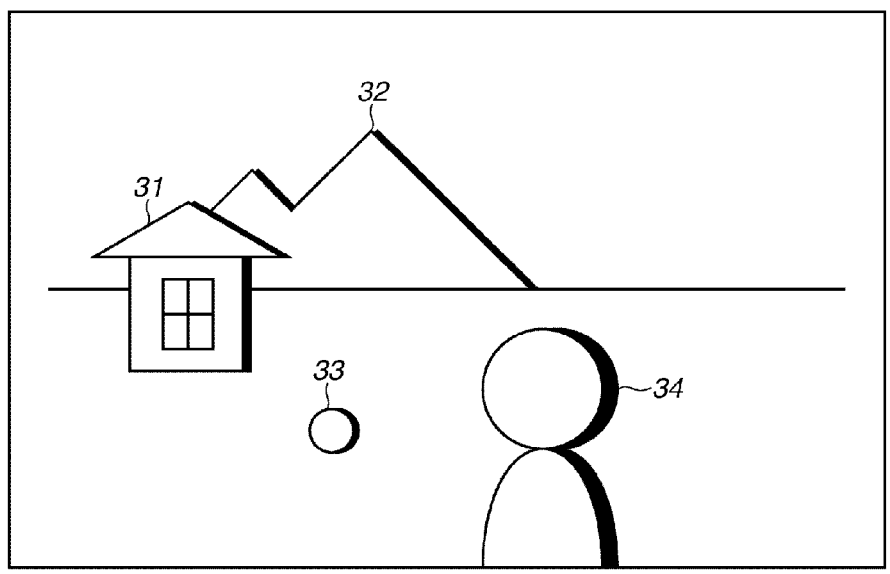
FIG. 3 is a diagram exemplifying the video content displayed after being switched.

FIG. 3 is a diagram exemplifying the video content displayed after the display content is switched. In FIG. 3, a mountain object 32 is in the background and a house object 31 is arranged toward the front, a ball object 33 is arranged further toward the front, and a person object 34 is arranged further toward the front.

Figure 4:
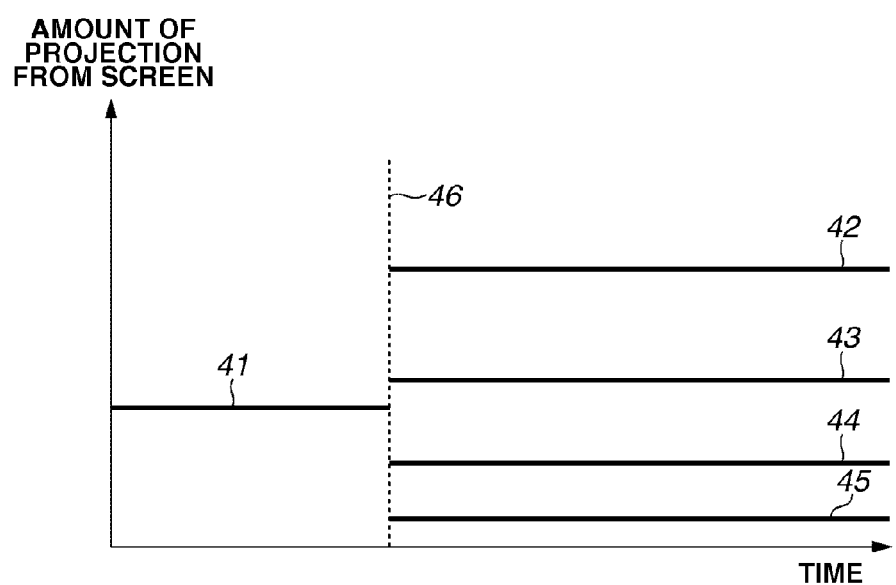
FIG. 4 is a diagram illustrating an example of change of a projection amount of the video content.

FIG. 4 is a diagram illustrating an example of change of the projection amount of video content.

In FIG. 4, the horizontal axis represents the passage of time and indicates that an elapsed time increases as it moves along the axis toward the right. The vertical axis represents the projection amount of stereoscopic video content from the screen and indicates that the projection amount of video content from the screen increases as it moves upward along the axis.

A projection amount 41 indicates the projection amount of the building object 23 in FIG. 2 and is the maximum projection amount in the screen illustrated in FIG. 2. A projection amount 42 indicates the projection amount of the person object 34 in FIG. 3 and a projection amount 43 indicates the projection amount of the ball object 33. A projection amount 44 indicates the projection amount of the house object 31 and a projection amount 45 indicates the projection amount of the mountain object 32. A dotted line 46 indicates the time when video content is switched and shows that the video content displayed in the screen is switched from the video content illustrated in FIG. 2 to the video content illustrated in FIG. 3 with the dotted line 46 serving as a switching point.

In FIG. 4, the projection amount 41 of the building object 23 and the projection amount 43 of the ball object 33 are almost the same. On the other hand, the difference between the projection amount 41 of the building object 23 and the projection amount 44 of the house object 31 is larger than that between the projection amount 41 and the projection amount 43 of the ball object 33. Similarly, the difference from the projection amount 41 of the building object 23 increases in the order of the projection amount 45 of the mountain object 32 and the projection amount 42 of the person object 34.

When the video content illustrated in FIG. 2 is switched to the video content illustrated in FIG. 3, the projection amount 42 of the person object 34 is far larger than the projection amount 41 of the building object 23. Thus, if the person object 34 is closely observed, the parallax on the display screen changes rapidly. Therefore, if the person object 34 suddenly appears in the foreground, the fusion limit of the user is exceeded, making stereoscopic vision impossible or causing fatigue.

In such a case, according to the present exemplary embodiment, a video image in regions where the projection amount changes at the time of switching video content is blurred and then the amount of blurring is gradually reduced. Images in which blurring is generated to mitigate such a rapid change of parallax will be called stereoscopic training images as described below.

Figure 10:
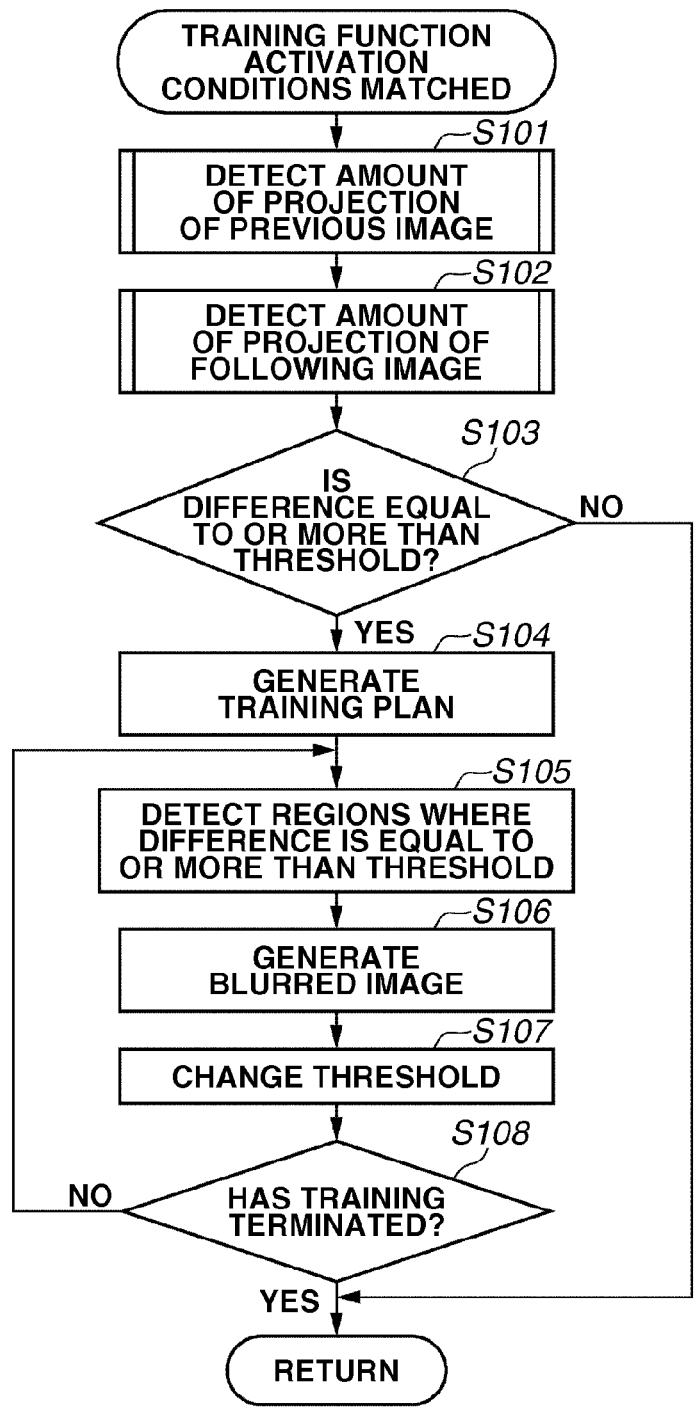
FIG. 10 is a flow chart exemplifying a generation procedure of a stereoscopic training image.

Next, the procedure for image generation processing when the function to generate a stereoscopic training image (hereinafter, called a training function) is activated will be described with reference to the flow chart in FIG. 10. When the training function is activated, projection amounts of images before and after the training function is activated are detected. Then, if the difference between both projection amounts is equal to or more than the threshold, regions having an projection amount equal to or more than the threshold are extracted from the image after the training function is activated and displays video content by blurring the extracted regions and gradually deblurring the extracted regions. The training function is activated when, for example, setting conditions received by the training setting input unit 95 are matched. If, for example, "when content is switched" is set as a setting condition, processing of the flow chart illustrated in FIG. 10 is started when the video content received by the video receiving unit 11 is switched to other content. At this point, the initial threshold of the projection amount is set by the blurring amount control unit 15.

FIG. 10 is a flow chart exemplifying processing for generating a stereoscopic training image.

First, in step S101, the projection amount detection unit 13 detects the projection amount of the image before the training function is activated and, in step S102, detects the projection amount of the image after the training function is activated. A detailed procedure for detecting the projection amount of an image will be described below. Next, in step S103, the blurred region determination unit 14 determines whether a region exists where the difference of projection amounts before and after the training function is activated is equal to or more than the threshold. If the region exists where the difference is equal to or more than the threshold as a result of the determination (Yes in step S103), the processing proceeds to step S104. If there is no region where the difference is equal to or more than the threshold (No in step S103), the processing terminates.

Next, in step S104, the blurring amount control unit 15 generates a training plan of stereoscopic training. As a plan of stereoscopic training, the duration of the training function and the degree of change of the projection amount for each video frame are set according to the difference of projection amounts. For example, the difference of projection amounts is divided into three categories and the time is set to 1 sec. if the difference is small, 2 sec. if the difference is intermediate, and 3 sec. if the difference is large. When the duration of the training function is set, the time may be directly specified from the keyboard.

Next, in step S105, the blurred region determination unit 14 detects regions where the difference of projection amounts in the image after the training function is activated is equal to or more than a predetermined value (threshold). Then, in step S106, the blurring amount control unit 15 generates blurred images for regions detected in step S105 where the difference is equal to or more than the threshold. As a generation method of a blurred image, for example, a blurred image is generated by removing high-frequency components by using a low-pass filter. At this point, the user may be allowed to select various filters such as an equalization filter, Gaussian filter, and motion filter. Regarding the amount of blurring, an image of increased blurring is generated by cutting high-frequency components in a region where the difference of projection amounts is large.

Next, in step S107, the blurring amount control unit 15 updates the threshold based on the training plan generated in step S104. It is assumed, for example, that the threshold of the difference of projection amounts in the initial state is "2", the projection amount of the image before activation is "1", the maximum projection amount of the image after activation is "9", and the time set for the training plan is 2 sec. In this case, regions where the projection amount of the image after the training function is activated is "3" or more, in other words, regions where the projection amount changes from "3" to "9" are determined to be regions where blurring is generated. If images of 60 frames are processed in a period of 1 sec., the value added to the threshold per frame is calculated as (9−3)/(60*2)=0.05 because the time set for the training plan is 2 sec.

Next, in step S108, the blurring amount control unit 15 determines whether the training function has terminated. If the training function has not terminated (No in step S108), the processing returns to step S105 and if the training function has terminated (Yes in step S108), the processing terminates. The termination determination of the training function is made by measuring the elapsed time from the training plan generated in step S104 or determining whether there is any region where the difference is equal to or more than the threshold reset in step S107.

With the above processing, when the training function is activated, projection amounts of images before and after activating the training function are detected. If the difference of both projection amounts is equal to or more than the threshold, regions having the projection amount equal to or more than the threshold are extracted. Then, images in which extracted regions are blurred are generated and the images are gradually deblurred. Then, data of blurred images is input by the output unit 16 to display video content on the display panel 99.

Next, detailed processing to detect the projection amount in steps S101 and S102 in FIG. 10 will be described with reference to the flow chart of FIG. 11. In the processing, it is first determined whether there is any instruction from the producer of video content and if there is an instruction, the instruction is followed. If the video format is a format in which the depth is specified, depth data is used. Otherwise, the projection amount is detected from the amount of parallax of each object in the image.

Figure 11:
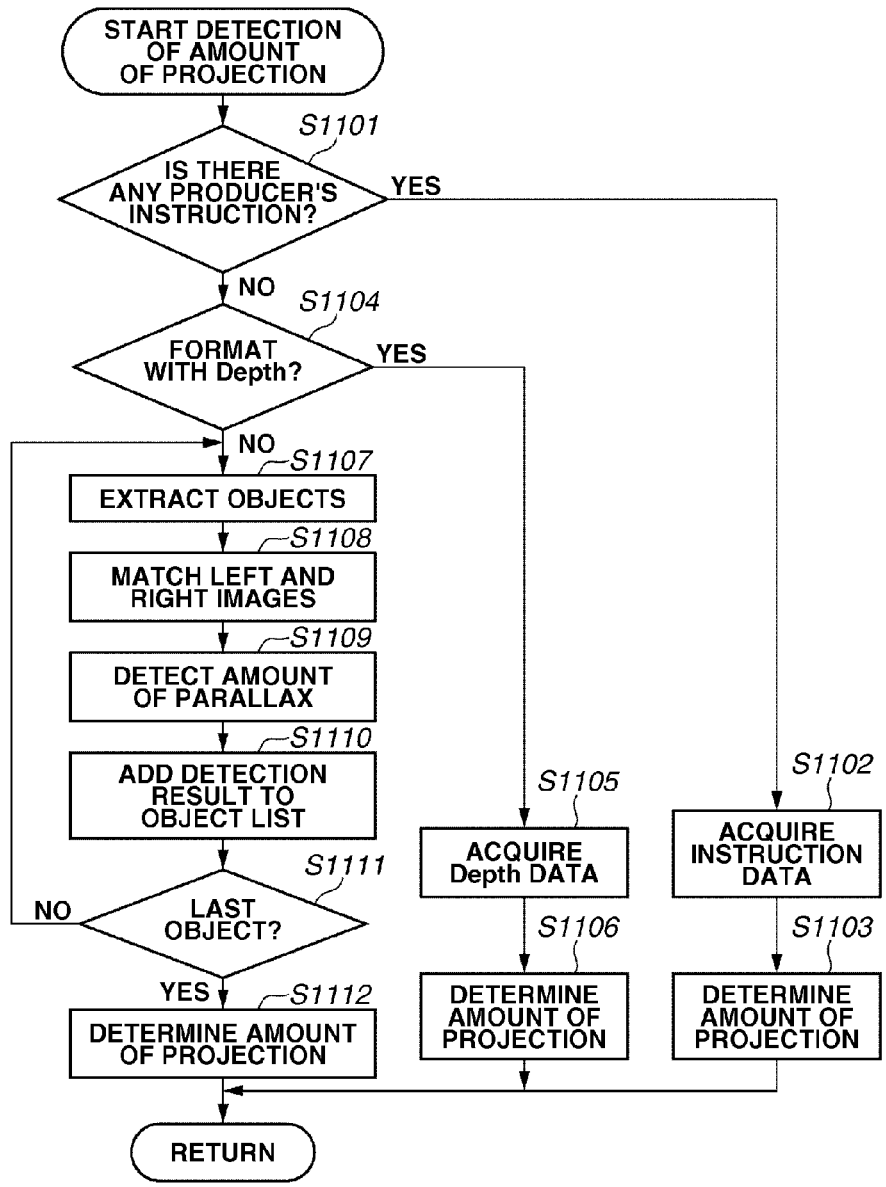
FIG. 11 is a flow chart exemplifying processing for detecting a projection amount.

FIG. 11 is a flow chart exemplifying the processing for detecting the projection amount in steps S101 and S102 in FIG. 10 by the projection amount detection unit 13.

First, in step S1101, the projection amount detection unit 13 determines whether there is instruction information of the producer. Instruction information of the producer may be contained, for example, in header information accompanying video data or may be input via the blurring method instruction unit 12. If there is instruction information as a result of the determination (Yes in step S1101), the processing proceeds to step S1102 and if there is no instruction information (No in step S1101), the processing proceeds to step S1104.

In step S1102, the projection amount detection unit 13 acquires instruction data from header information accompanying video data. Alternatively, instruction data may be acquired from a server of the content producer via a communication network. Next, in step S1103, the projection amount detection unit 13 determines the projection amount based on the acquired instruction data before terminating the processing.

In step S1104, on the other hand, the projection amount detection unit 13 determines whether video data has a video format in which video data specifies the depth. The video format in which the depth is specified is a video format that has depth information indicating the depth direction from the screen for each object in the video. If, as a result of the determination, the video format is a format in which the depth is specified (Yes in step S1104), the processing proceeds to step S1105 and if the video format is not a format in which the depth is specified (No in step S1104), the processing proceeds to step S1107.

In step S1105, the projection amount detection unit 13 acquires depth information for each object from the received video content. Next, in step S1106, the projection amount detection unit 13 determines the projection amount for each object from the acquired depth information before terminating the processing.

In step S1107, on the other hand, the projection amount detection unit 13 extracts objects from inside the screen of the video content. Any publicly known method may be used as an extraction method of objects and borderlines may be tracked to extract objects or a color distribution may be detected to extract objects.

Next, in step S1108, the projection amount detection unit 13 performs matching of objects between left and right images. More specifically, the matching is performed by searching where an object extracted on the left-eye screen is located on the right-eye screen. Then, in step S1109, the projection amount detection unit 13 detects the amount of parallax from a difference of positions of the object extracted from the left and right images. The amount of parallax of an object may be obtained by using a difference of center positions of the object or an average value of the amount of parallax of each characteristic point. Next, in step S1110, the projection amount detection unit 13 generates an object list and adds a detection result.

FIG. 8 is a diagram illustrating a configuration example of an object list. In the object list, information about the position and the amount of parallax of each object are recorded. In FIG. 8, a field 81 is an object ID, which is an ID number allocated to each object. A field 82 is an X coordinate of an object on the left-eye screen and a field 83 is a Y coordinate of the object on the left-eye screen. A field 84 is an amount of parallax between left and right images and a field 85 is a projection amount from the screen, determined in step S1112 as described below.

Returning to FIG. 11, next, in step S1111, the projection amount detection unit 13 determines whether the above processing has been performed on all objects in the screen. If the above processing has been performed on all objects (Yes in step S1111), the processing proceeds to step S1112 and if the above processing has not been performed on all objects (No in step S1111), the processing returns to step S1107. Then, in step S1112, the projection amount detection unit 13 determines the projection amount for each object based on the object list before terminating the processing.

If an object itself has a great depth, the depth may change significantly. Thus, the object is divided into a plurality of objects each having close depths, which are registered in the object list. For example, if a road leads from the near side toward the back in a scene in which the background is photographed, the road is divided into a plurality of portions each having close depths, which are registered in the object list. In the example illustrated in FIG. 3, according to a procedure as described above, the person object 34 shows the largest projection amount and the ball object 33, the house object 31, and the mountain object 32 are detected as objects showing the projection amount from the screen in a descending order.

Figure 5:
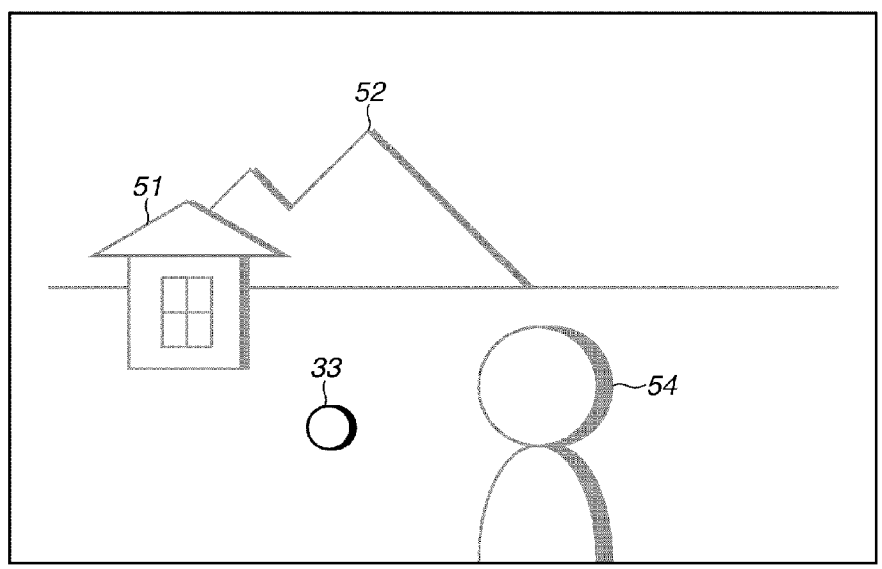
FIG. 5 is a diagram exemplifying an initial stereoscopic training image.
Figure 6:
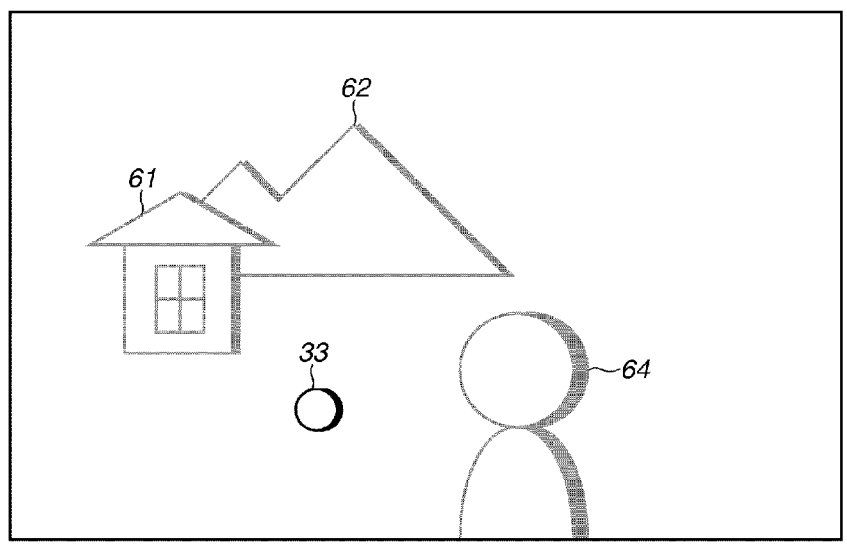
FIG. 6 is a diagram exemplifying an intermediate stereoscopic training image.
Figure 7:
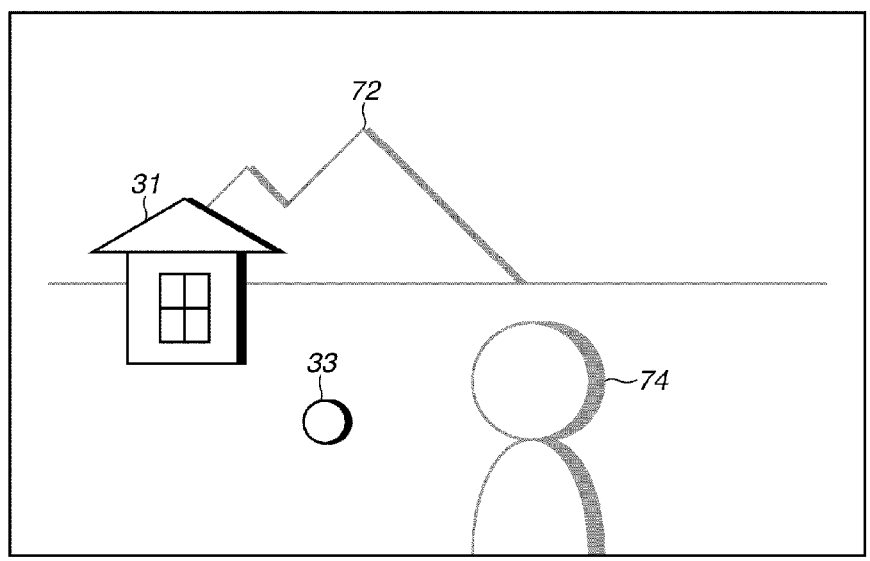
FIG. 7 is a diagram exemplifying an advanced stereoscopic training image.

FIGS. 5 to 7 are diagrams exemplifying images in which blurring is added to portions of the image illustrated in FIG. 3 as stereoscopic training images. Components similar to those in FIG. 3 are denoted with the same numbers and the description thereof will not be repeated.

FIG. 5 is a diagram exemplifying an initial image of a stereoscopic training image. In FIG. 5, a house object 51 is an image obtained by adding blurring to the house object 31 in FIG. 3. Similarly, a mountain object 52 is an image obtained by adding blurring to the house object 32 in FIG. 3 and a person object 54 is an image obtained by adding blurring to the person object 34 in FIG. 3. The amount of blurring of each object increases as difference from the projection amount of the ball object 33 increases. On the other hand, no blurring is added to the ball object 33 because the projection amount 41 of the building object 23 and the projection amount 43 of the ball object 33 are almost the same.

FIG. 6 is a diagram exemplifying the stereoscopic training image after a time passes from the image illustrated in FIG. 5.

In FIG. 6, a house object 61 has a less amount of blurring than that of the house object 51 illustrated in FIG. 5 and a mountain object 62 has a less amount of blurring than that of the mountain object 52 illustrated in FIG. 5. Similarly, a person object 64 has a less amount of blurring than the person object 54 illustrated in FIG. 5. Thus, a plurality of objects whose amount of blurring continuously changes is present between the image illustrated in FIG. 5 and the image illustrated in FIG. 6.

FIG. 7 is a diagram exemplifying the stereoscopic training image after a time further passes from the image illustrated in FIG. 6.

In FIG. 7, a mountain object 72 has a still less amount of blurring than that of the mountain object 62 illustrated in FIG. 6. Similarly, a person object 74 has a still less amount of blurring than that of the person object 64 illustrated in FIG. 6. On the other hand, a threshold increases with the passage of time. As a result, the difference of projection amounts falls below the threshold so that blurring disappears. Thus, a plurality of objects whose amount of blurring continuously changes is present between the image illustrated in FIG. 6 and the image illustrated in FIG. 7.

When the training function is terminated after a time further passes, the image looks almost like the image in FIG. 3 and becomes an end image of the stereoscopic training after a time further passes from the image illustrated in FIG. 7. Thus, a plurality of objects whose amount of blurring continuously changes is present between the image illustrated in FIG. 7 and the image illustrated in FIG. 3.

As illustrated in FIGS. 5 to 7, when display content is switched, the parallax can be prevented from changing rapidly by blurring regions where the difference of projection amounts is large, and displaying a gradually deblurred image from regions where the difference of projection amounts is small. Accordingly, when switching to new display content, rapid movement of the line of sight can be prevented by stereoscopic training. In the present exemplary embodiment, stereoscopic training images are generated when display content is switched. In the same content, on the other hand, stereoscopic training images may be generated when a scene changes.

The video image used for detecting the projection amount may be a video frame at the beginning or after a predetermined time lapses or an average value of each projection amount of a predetermined number of video frames. Further, a whole scene at the beginning may be used. When stereoscopic training images are generated, the pace of deblurring may be linear or curvilinearly increased. If the depth changes in one scene of video content, the pace of deblurring may be changed according to the change of the depth.

On the other hand, the speed at which blurring of stereoscopic training images is generated may be switched for each viewer by setting up a camera to capture viewers, storing face information of the viewers, and detecting the viewer by using a publicly known face recognition function. Alternatively, a camera may be set up to capture a viewer and to measure the distance between a viewer and the display panel 99 such that a value of the threshold at which blurring is generated, may be changed based on a measured distance. For example, if the distance is short, the threshold of the projection amount is set smaller and any region where the projection amount changes a little is blurred and gradually deblurred. On the other hand, if the distance is long, the threshold of the projection amount is set larger and only regions where the projection amount materially changes are blurred and gradually deblurred.

The present invention is also realized by performing processing shown below. The processing in which software (program) realizing functions of the above exemplary embodiment is supplied to a system or an apparatus via a network or various storage media, and a computer (or a central processing unit (CPU) or micro processing unit (MPU)) of the system or the apparatus reads and executes the program to realize the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-278091 filed Dec. 14, 2010, which is hereby incorporated by reference herein in its entirety.

What is claimed is:

1. A display control apparatus that displays a stereoscopic image to a viewer, comprising:
an input unit that inputs a first stereoscopic image and a second stereoscopic image to be displayed after the first stereoscopic image, the first and second stereoscopic image including a subject;
a detection unit that detects a change amount of a projection between a partial image in a region of the first stereoscopic image and a corresponding partial image in a corresponding region of the second stereoscopic image, the change amount being a temporal difference between a first amount by which the subject looks projected forward in the first stereoscopic image and a second amount by which the subject looks projected forward in the second stereoscopic image;
a determination unit that determines if the detected change amount is greater than or equal to a predetermined threshold;
a generation unit that generates a blurred image from the corresponding partial image in the corresponding region of the second stereoscopic image if the detected change amount is greater than or equal to a predetermined threshold; and
a display control unit that controls a display apparatus to display a blurred image in the corresponding partial region of the second stereoscopic image if the detected change amount is greater than or equal to a predetermined threshold and to display the corresponding partial image which is not blurred by the generation unit if the detected change amount is less than the predetermined threshold.

2. The display control apparatus according to claim 1, wherein the generation unit generates a video in which a suppression amount of the high-frequency components decreases compared to the high-frequency suppressed image with passage of time.

3. The display control apparatus according to claim 1, wherein the detection unit detects the change amount of the projection for each subject, and
the generation unit generates the blurred image in which a high-frequency components are suppressed in different periods for each subject according to the change amount detected by the detection unit for each subject.

4. The display control apparatus according to claim 1, further comprising a setting unit that sets at least one condition for generating the suppressed blurred image, wherein
if the at least one condition set by the setting unit is satisfied by a region or a time, the generation unit generates the blurred image.

5. The display control apparatus according to claim 1, wherein the detection unit detects the change amount of the projection based on a maximum projection amount of the second stereoscopic image.

6. A display control method for a display control apparatus that displays a stereoscopic image to a viewer, the method comprising:

inputting first image data related to a first stereoscopic image and second image data related to a second stereoscopic image to be displayed after the first stereoscopic image, the first and second stereoscopic image including a subject;

detecting a change amount of a projection of the stereoscopic image between a partial image in a region of the first stereoscopic image and a corresponding partial image in a corresponding region of the second stereoscopic image, the change amount being a temporal difference between a first amount by which the subject looks projected forward in the first stereoscopic image and a second amount by which the subject looks projected forward in the second stereoscopic image;

determining if the detected change amount is greater than or equal to a predetermined threshold;

a blurred image obtained from the corresponding partial image in the corresponding region of the second stereoscopic image if the detected change amount is greater than or equal to a predetermined threshold; and displaying a blurred image in the corresponding partial region of the second stereoscopic image if the detected change amount is greater than or equal to a predetermined threshold and to display the corresponding partial image which is not blurred if the detected change amount is less than the predetermined threshold in a display apparatus.

7. A non-transitory computer readable storage medium that stores a program to control a display control apparatus that displays a stereoscopic image to a viewer, causing a computer to execute operations comprising:

inputting first image data related to a first stereoscopic image and second image data related to a second stereoscopic image to be displayed after the first stereoscopic image, the first and second stereoscopic image including a subject;

detecting a change amount of a projection of the stereoscopic image between a partial image in a region of the first stereoscopic image and a corresponding partial image in a corresponding region of the second stereoscopic image, the change amount being a temporal difference between a first amount by which the subject looks projected forward in the first stereoscopic image and a second amount by which the subject looks projected forward in the second stereoscopic image;

determining if the detected change amount is greater than or equal to a predetermined threshold;

a blurred image obtained from the corresponding partial image in the corresponding region of the second stereoscopic image if the detected change amount is greater than or equal to a predetermined threshold; and displaying a blurred image in the corresponding partial region of the second stereoscopic image if the detected change amount is greater than or equal to a predetermined threshold and to display the corresponding partial image which is not blurred if the detected change amount is less than the predetermined threshold in a display apparatus.

* * * * *